United States Patent
Kuttner et al.

(10) Patent No.: US 8,152,184 B2
(45) Date of Patent: Apr. 10, 2012

(54) VEHICLE SUSPENSION SYSTEM

(75) Inventors: Oliver Christoph Ferdinand Kuttner, Charlottesville, VA (US); Ronald Christopher Mathis, Indianapolis, IN (US)

(73) Assignee: Edison2 LLC, Charlottesville, VA (US)

( * ) Notice: Subject to any disclaimer, the term of this patent is extended or adjusted under 35 U.S.C. 154(b) by 155 days.

(21) Appl. No.: 12/765,567

(22) Filed: Apr. 22, 2010

(65) Prior Publication Data

US 2011/0260422 A1  Oct. 27, 2011

(51) Int. Cl.
*B60G 3/20* (2006.01)

(52) U.S. Cl. ..... 280/124.128; 280/124.11; 280/124.117; 280/124.125

(58) Field of Classification Search ............. 280/124.11, 280/124.113, 124.116, 124.117, 124.125, 280/124.13, 124.153, 124.154
See application file for complete search history.

(56) References Cited

U.S. PATENT DOCUMENTS

| | | | | |
|---|---|---|---|---|
| 2,082,620 A | * | 6/1937 | Ellefsen | 267/230 |
| 2,087,299 A | * | 7/1937 | Pribil | 16/44 |
| 2,241,217 A | | 4/1939 | Peeters | |
| 2,271,304 A | * | 1/1942 | Mulholland | 16/44 |
| 2,644,699 A | * | 7/1953 | Weiertz et al. | 280/5.508 |
| 4,168,082 A | * | 9/1979 | Hendrickson | 280/405.1 |
| 4,815,759 A | * | 3/1989 | Imai et al. | 280/21.1 |
| 4,919,441 A | * | 4/1990 | Marier et al. | 280/21.1 |
| 6,257,604 B1 | | 7/2001 | Laurent et al. | |
| 6,634,654 B2 | * | 10/2003 | Mackle et al. | 280/5.521 |
| 6,783,137 B2 | * | 8/2004 | Nagreski et al. | 280/93.512 |
| 6,789,810 B2 | * | 9/2004 | Strong | 280/124.128 |
| 7,434,823 B2 | * | 10/2008 | Robinson | 280/124.153 |
| 7,644,938 B2 | | 1/2010 | Yamada | |
| 2010/0052289 A1 | * | 3/2010 | Frey et al. | 280/442 |

* cited by examiner

*Primary Examiner* — Paul N Dickson
*Assistant Examiner* — Barry Gooden, Jr.
(74) *Attorney, Agent, or Firm* — Woods Rogers PLC; Peter E. Rosden

(57) ABSTRACT

A structurally efficient vehicle suspension system capable of being isolated from the main vehicle structure by being housed within a vehicle's wheel thereby reducing risks of injury during a crash and permitting advantageous redesign of suspension geometry. By rotating the suspension link pivot axes approximately 90 degrees when compared with the positioning of traditionally known wishbone suspension systems, the upper and lower suspension links for each vehicle wheel are relocated to run essentially parallel to the axis of travel of the vehicle. Consequently, for each wheel the virtual longitudinal link length runs parallel with the axis of travel of the vehicle indicated by the arrow and virtual swing axle length runs perpendicularly to virtual longitudinal link length. However, the upper link pivot axis and the lower link pivot axis now run parallel to virtual swing axle and their convergence point defines its length.

11 Claims, 8 Drawing Sheets

VEHICLE SUSPENSION SYSTEM

TECHNICAL FIELD

The subject invention relates generally to the field of suspension systems for automotive vehicles. More specifically, the system positions all of the moving parts of a suspension system either inside of or immediately adjacent to each wheel of the vehicle enabling advantageous reshaping of the vehicle.

BACKGROUND OF THE INVENTION

Known conventional suspension systems often suffer from one or more problems that individually and/or collectively restrict the design, utility, economy and safety of the vehicles in which they are used. There are many designs which can be considered "conventional" suspension systems, but there are five principal variations.

The first is the Wishbone design which consists of multiple predominantly transverse members ("links") with their inboard (chassis end) pivot axes aligned or nearly so with the vehicle's direction of travel. The links are connected at their outboard end to an "upright" that in turn carries the wheel. Wishbone suspension is conventionally seen as the best solution because, when designed well, it offers desirable geometric characteristics. This design is used most in very high performance/value cars but a combination of its relative complexity (and therefore high cost) and space requirements prevent higher utilization in ordinary passenger vehicles.

The second is the Strut design which is commonly used in low to mid-range passenger vehicles because of its relative economy of manufacture. Strut-type suspension consists of a predominantly planar transverse member to carry lateral and longitudinal loads and a predominantly vertical member to handle vertical loads. For the suspension to move, the vertical member has to be telescopic, this sliding function normally being performed by the damper. While such combining of purpose and function is desirable for economy of manufacture, they are accompanied by the disadvantages of compromised geometry and the imposition of side loads on the damper.

The third is the Beam design which comes is two basic varieties: live and dead. A live beam axle is one that provides drive to its wheels, a typical example being a pickup truck rear axle. Dead beam axles provide no drive and are often used at the front of heavy duty vehicles such as semi tractors and busses. Beam axles are cheap to manufacture but have numerous disadvantages including not allowing independent wheel motion, high unsprung weight and, because the whole axle moves with suspension travel, they take up a lot of room.

The fourth is the Leading/Trailing Link design which was once fairly common but is now used much less frequently. This was the design used for the front suspension of the original Volkswagen Beetle vehicle. Disadvantages include the absence of camber compensation for roll, difficulty of arranging bump-steer free steering and large size.

The last is the Swing Arm design which consists of a single substantially transverse member with its inboard pivot axis substantially aligned with the vehicle's direction of travel. This is the simplest type of independent suspension. Disadvantages include its necessarily short length causing awkwardly large camber change with the attendant gyroscopic action and its proclivity for undesirable jacking effects. The jacking effect of the Corvair's swing arm rear suspension is illustrated on the cover of Ralph Nader's book, Unsafe At Any Speed.

There are numerous subtypes of the above-mentioned suspension designs such as, for example, semi-trailing links or the deDion arrangement, that combine elements of more than one primary suspension type or at least mitigate some of their worst characteristics. These variations are common knowledge to any expert in suspension design.

Therefore, it is clear that a fundamental problem in designing any automotive suspension system is counterbalancing conflicting requirements such as cost, weight, packaging constraints and geometric characteristics. What is required is a suspension system which provides previously unavailable combinations of desirable characteristics while, at the same time, enabling manipulation of individual geometric settings incorporated into a vehicle without generating conflicts between such settings.

In addition, where and how a vehicle's suspension is mounted has a large bearing on the safety consequences of the overall design. For example, conventional wishbones are strong, slender pieces that terminate close to the vehicle's occupants with the attendant possibility in a crash of injury through penetration into the passenger compartment. Even the very common strut suspension requires a large notch in the car's construction which results in two main failings. Firstly, it is structurally inefficient leading to undesirably high vehicle weights and, secondly, the re-entrant corner required to house the wheel and its suspension tends to trap the wheel in a collision. This last point is significant: the wheel acts as a very stiff barrier tending to cause high peak decelerations (increasing the chance of occupant injury) and energy is not dissipated by shedding components.

Another important reason for adopting a suspension system differing from those already known in the art is to facilitate reshaping the vehicle to improve the rate of fuel consumption. Current passenger vehicle aerodynamics have been optimized to the point that it is difficult to tell the difference between brands. Further aerodynamic improvements of any appreciable magnitude will require a new aerodynamic approach and vehicles of substantially different shape and appearance to those currently sold. This requirement for new vehicle shape will render traditional suspension systems obsolete.

SUMMARY OF THE INVENTION

This invention relates to a suspension system for use in vehicles wherein all moving parts of the suspension are isolated from the main structure of the vehicle by being positioned either inside of or immediately adjacent to a wheel. A suspension assembly for a vehicle wheel is provided in which the wheel has a known axis of travel and the vehicle is connected to each suspension assembly by a transverse beam A king pin axis is attached to the transverse beam and a steering carrier assembly pivotally attached to the king pin axis. A steering link track rod is further movably attached to the steering carrier assembly. A spring/damper unit having a sprung end and an unsprung end is attached on its sprung end to the king pin axis. At least one upper suspension link is oriented along its length generally parallel to the axis of travel of the vehicle and has a pivot axis generally perpendicular to the axis of travel of the vehicle. Each upper suspension link is pivotally attached on a first sprung end to the steering carrier assembly. At least one lower suspension link is oriented along its length generally parallel to the axis of travel of the vehicle and is spaced below and away from any upper suspension link. Each lower suspension link has a pivot axis generally perpendicular to the axis of travel of the vehicle and is pivotally attached on a first sprung end to the steering carrier assembly. Finally, a wheel carrier is attached by a first bearing assembly to the second unsprung end of each upper suspension link and by a second bearing assembly to the second unsprung end of each lower suspension link.

A primary object of this invention is to permit the most desirable geometric characteristics of a suspension to be packaged more tightly than in any other suspension design.

Another object of this invention is to offer much greater overall vehicle design freedom than any comparable suspension design.

A further object of this invention is to allow other desirable but previously difficult to achieve vehicle design characteristics such as light weight and more ideal streamlining to be incorporated into the vehicle.

Yet another object of this invention is to offer the possibility of improved vehicle crash safety.

An additional object of this invention is to retain the ability to drive the steering wheels in either a front wheel drive or four wheel drive mode while still retaining the other advantages provided by the disclosed suspension system.

Still a further object of this invention is to offer the possibility, if desired, to substantially independently set, adjust and tune longitudinal, transverse and steering geometry.

Still another object of this invention is to enable configuration of the vehicle with single axis bearings, depending on design choices made.

Yet an additional object of this invention is to minimize impingement on vehicle interior space resulting from the suspension system.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

The system of this invention is applicable to steered and non-steered suspensions and may be used either at a vehicle's front or rear wheels. The following description assumes a front axle, steered suspension.

Figure 1:
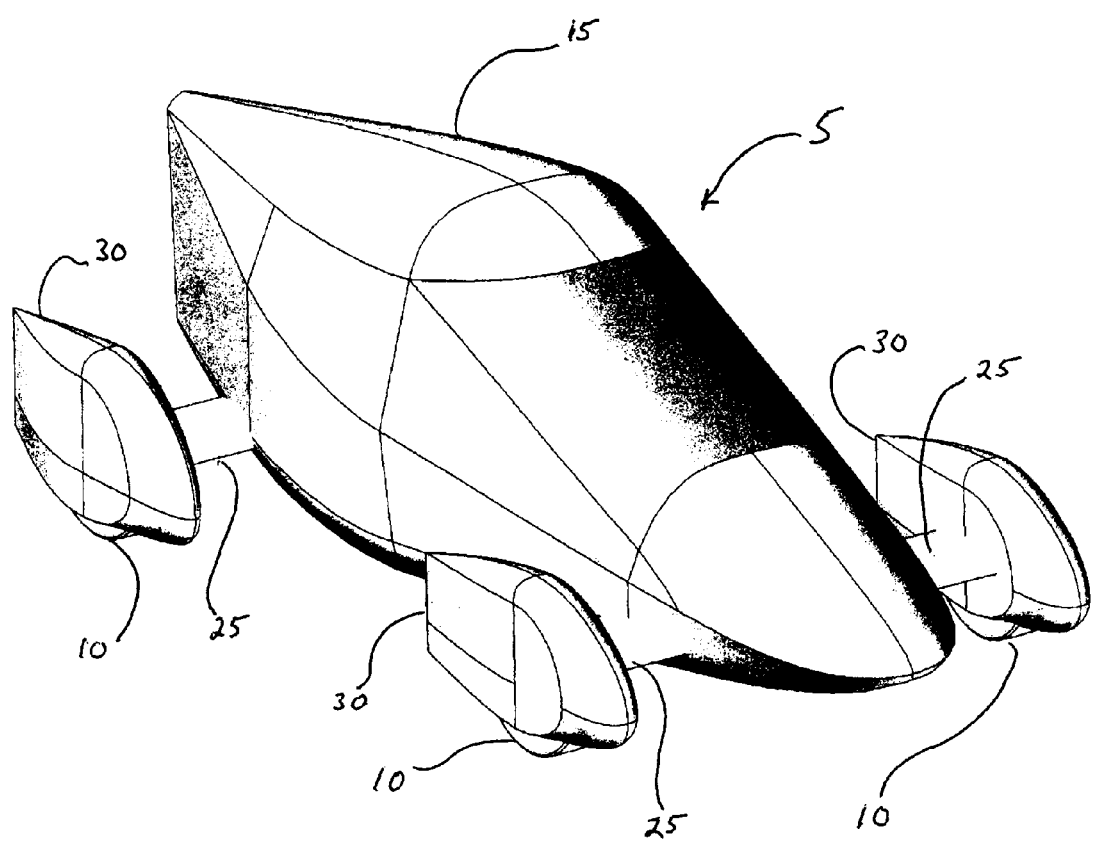
FIG. 1 is a perspective view of an automotive vehicle body employing a suspension system constructed according to the principles of this invention.

FIG. 1 provides a perspective view of the exterior of a vehicle 5 employing the suspension system of this invention. Tires 10 are positioned outboard from the vehicle's main body structure 15. Each tire 10 is mounted on a wheel 20 which is not visible in FIG. 1. In the novel system of this invention all moving suspension components are positioned close to or inside of an actual wheel 20. The moving components are, in turn, attached to the vehicle's main structure 15 with a rigid, relatively inflexible transverse beam 25, the shape of which may be straight or assume another configuration, as desired. Each tire 10 and wheel 20 assembly is surrounded by a cowling 30 of minimized cross section to facilitate air flow and thereby reduce aerodynamic drag.

Figure 2:
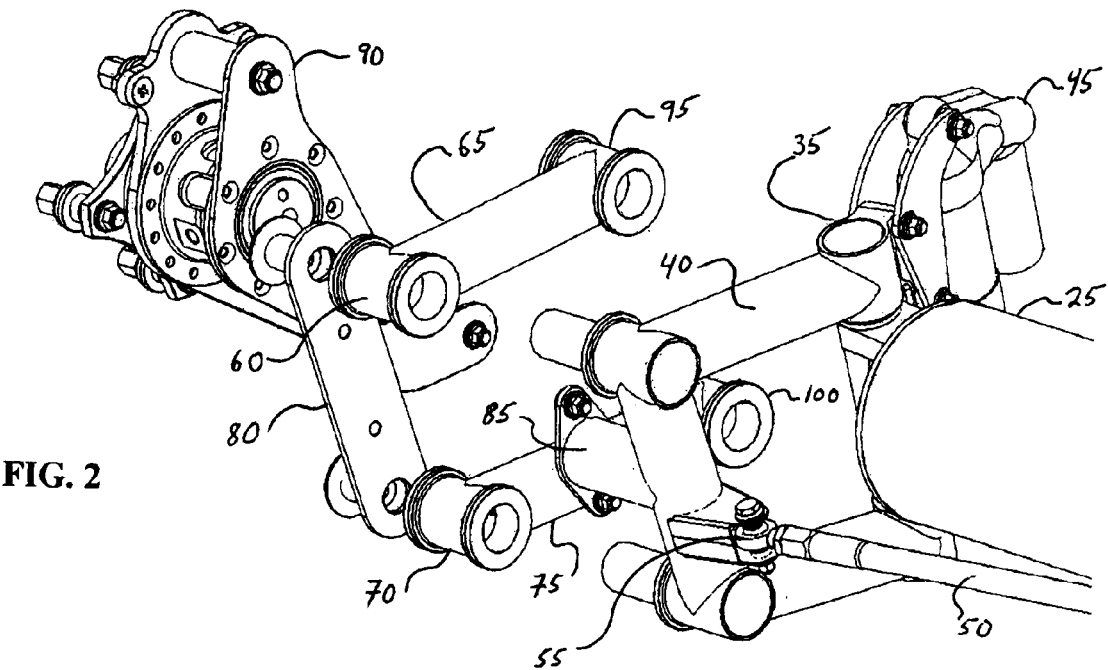
FIG. 2 is a perspective inboard view from the back looking forwards of a vehicle of the disassembled components of a suspension system embodying the principles of this invention.

FIG. 2 presents an inboard perspective angled view from the front end of a vehicle looking forwards at the main disassembled components of a preferred embodiment of a suspension system constructed according to the principles of this invention. In this disclosure, a front axle steered suspension is being described. Therefore, the positions from which views illustrated in the various figures are described are relative to a front axle of a vehicle. In this embodiment, the steering axis is inboard of the suspension such that the whole suspension is involved in steering the vehicle. In a second embodiment, steering of the vehicle occurs outboard of the suspension system which is a configuration advantageously adopted in the event the suspension system is employed on a driving axle. In the first embodiment, transverse beam 25 is connected to and terminates at king pin axis 35 which is typically angled from the vertical to provide castor and king pin inclination. Steering carrier assembly 40 is attached to and pivots on king pin axis 35 as determined by the position of steering link track rod 50 and swivel 55 to which track rod 50 is attached. The sprung end of spring/damper unit 45 is preferentially attached to king pin axis 35 but may be attached to some other sprung part of the car's structure, while the unsprung end of spring/damper unit 45 may be attached either to wheel carrier assembly 90, discussed below, or to one of the fore/aft links. Springs and dampers are very ordinary automotive art. For convenience and clarity, a concentric spring/damper unit is shown but the invention's function is independent of the exact spring and damper combination/arrangement chosen. Upper suspension link 65 and lower suspension link 75 pivot on steering carrier 40, respectively, at bearings 60 and 70. Bearings 60 and 70 are typically stabilized by shear plate 80, although use of such a plate is not mandatory. The stability of plate 80 may be enhanced by means of attachment to bracket bar 85 running from steering carrier assembly 40. Bearings 60 and 70 may be comprised of a single bushing or, more usually, multiple closely-spaced bushings which pivot on the sprung part of vehicle 5. In the interests of higher stiffness in heavily loaded applications, bearings 60 and 70 may have the base between their left and right elements expanded. If expanded far enough, suspension links 65 and 75 would then assume a triangular "wishbone" shape. The angular and positional relationship of the working axes of bearings 60 and 70 determine the substantially transverse geometry (roll center, camber change, etc.) of the suspension. Wheel carrier assembly 90 joins suspension links 65 and 75 to the wheel mounts, respectively, via first bearing assembly 95 and second bearing assembly 100 which are located at the unsprung end of links 65 and 75. The positional, angular and length relationship of links 65 and 75 determine the substantially longitudinal geometry (anti-dive, etc.) of the suspension. Note that in FIG. 2, there are only two fore/aft links, 65 and 75. It is possible, and may in some circumstances be desirable, to have more than two fore/aft links joining steering carrier 40 to wheel carrier 90 for reasons such as deliberately inducing bump steer. Furthermore, depending on the exact application, bearings with more than one axis of rotation, e.g. spherical bushings, and/or compliance, e.g. rubber bushings, may be required as bearings 60, 70, 90 and 95 and whatever bearings may be at the ends of any fore/aft links beyond links 65 and 75 which may be optionally incorporated in the suspension structure.

Figure 3:
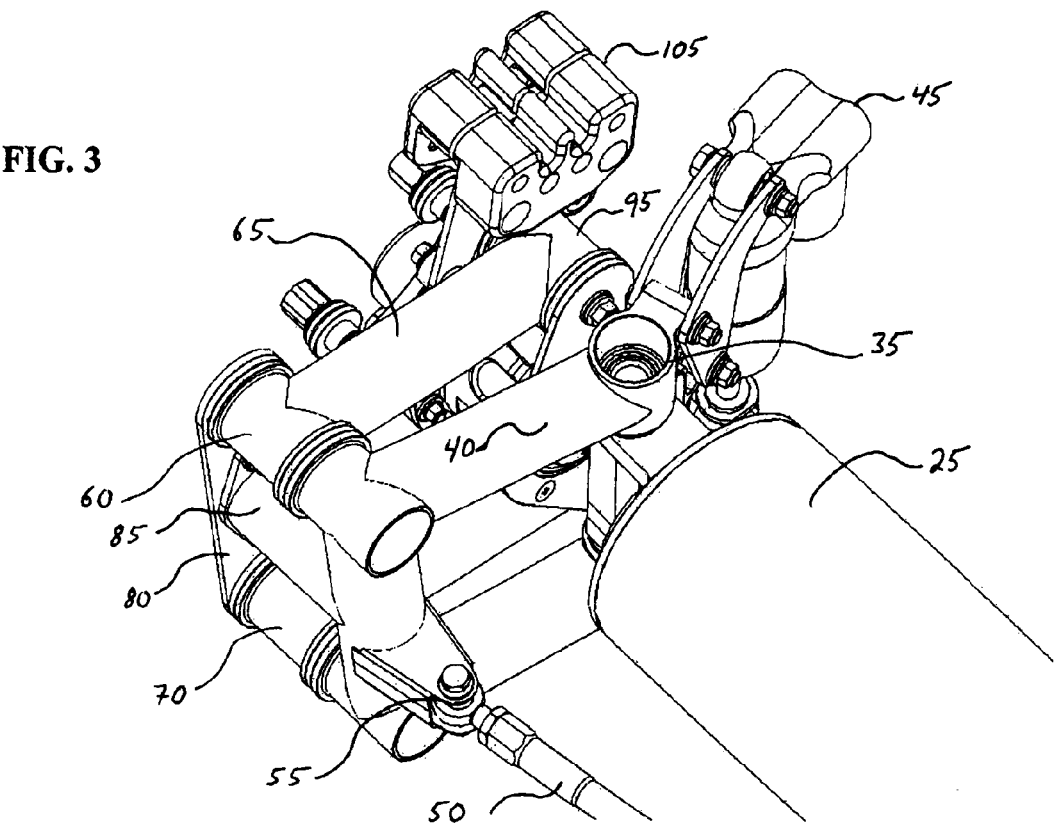
FIG. 3 is a perspective inboard view from the back looking forwards of a vehicle of the assembled components of a suspension system embodying the principles of this invention.
Figure 4:
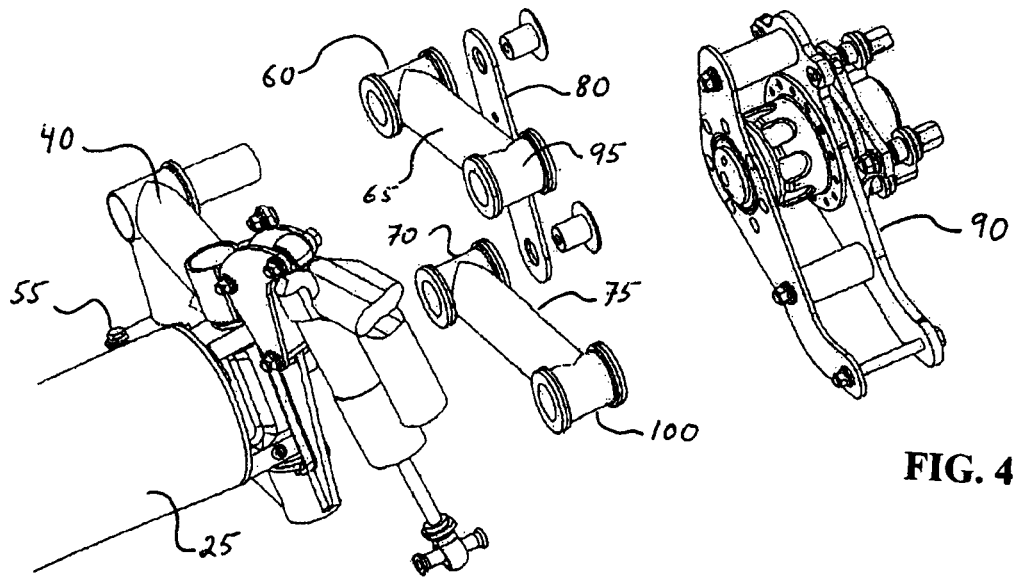
FIG. 4 is a perspective inboard view from the front looking rearwards of a vehicle of the disassembled components of a suspension system embodying the principles of this invention.
Figure 5:
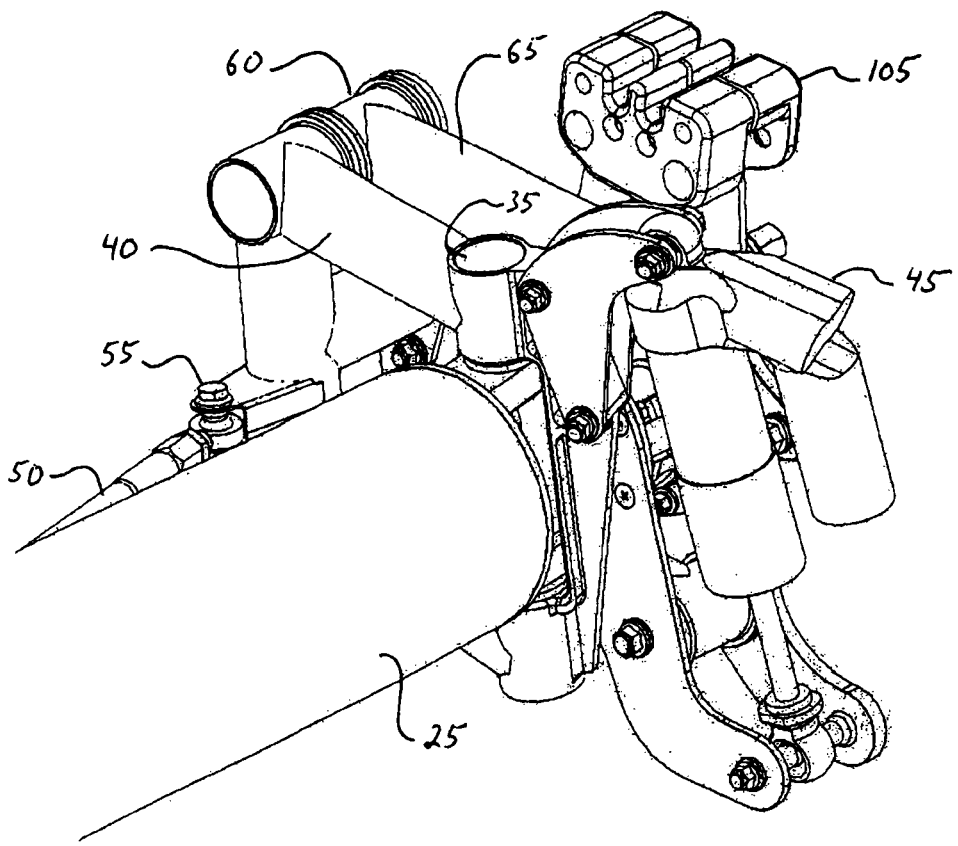
FIG. 5 is a perspective inboard view from the front looking rearwards of a vehicle of the assembled components of a suspension system embodying the principles of this invention
Figure 6:
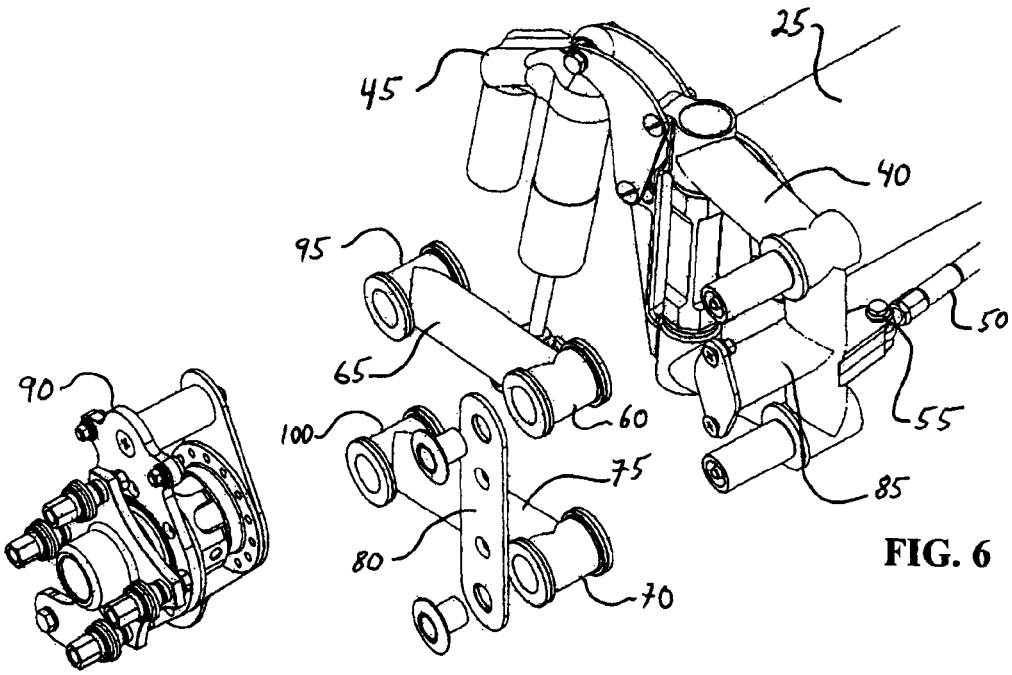
FIG. 6 is a perspective outboard view from the rear looking forwards of a vehicle of the disassembled components of a suspension system embodying the principles of this invention.
Figure 7:
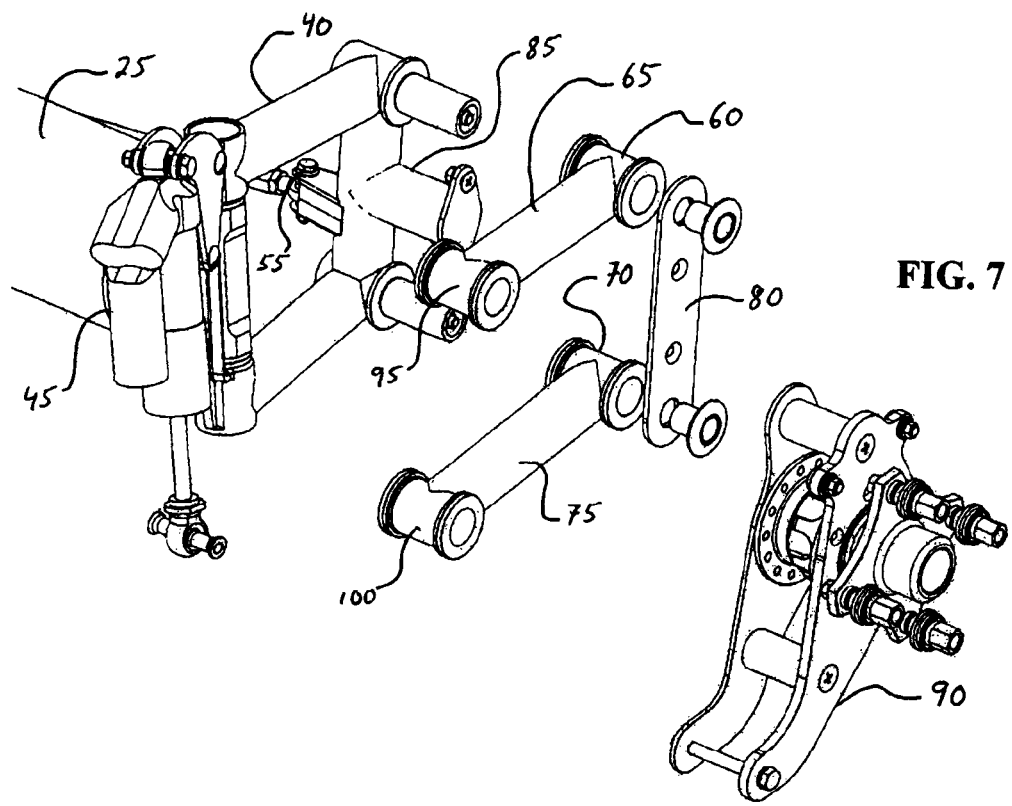
FIG. 7 is a perspective outboard view from the front looking rearwards of a vehicle of the disassembled components of a suspension system embodying the principles of this invention
Figure 8:
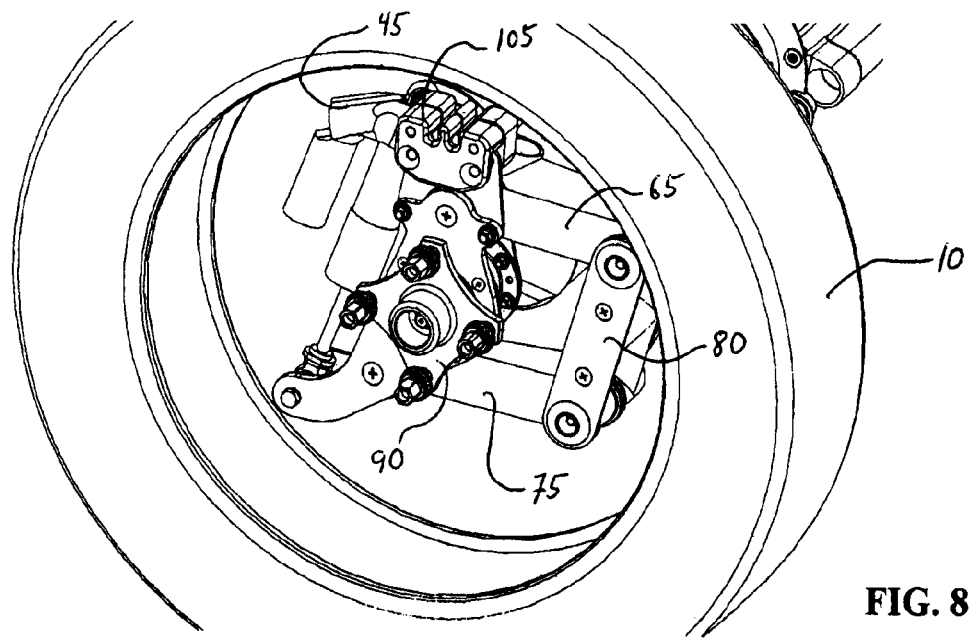
FIG. 8 is a perspective outboard view of the assembled components of a suspension system embodying the principles of this invention.
Figure 9:
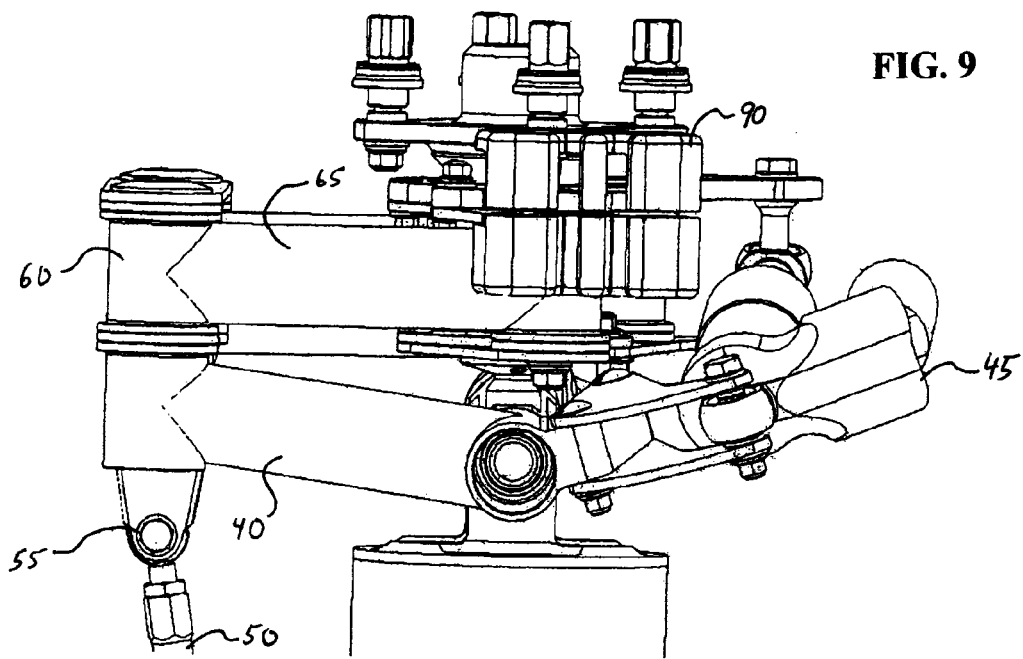
FIG. 9 is an overhead view of the assembled components of a suspension system embodying the principles of this invention.
Figure 10:
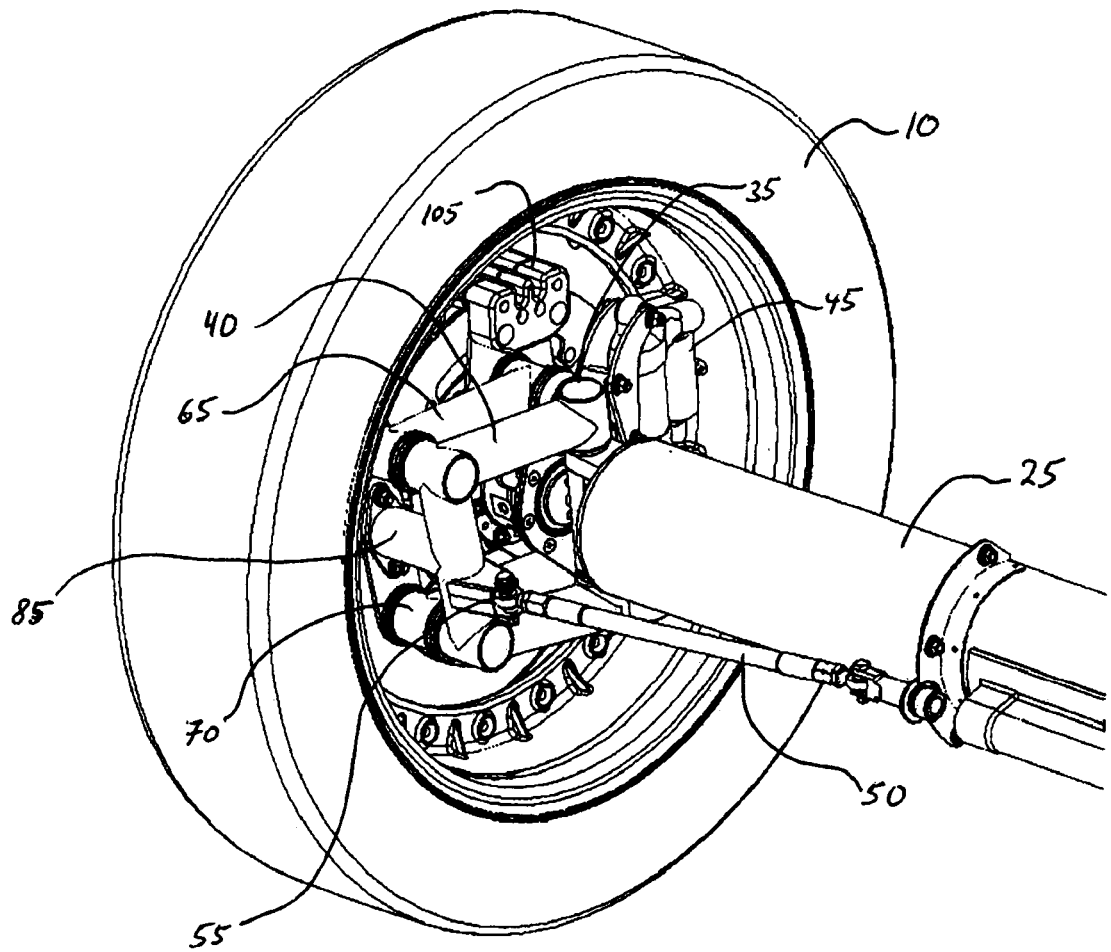
FIG. 10 is a perspective inboard view from the rear looking forwards of a vehicle of the assembled components of a suspension system embodying the principles of this invention as it would appear when installed within the wheel rim of a wheel structure.

FIG. 3 provides a further inboard perspective angled view from the rear end of a vehicle looking forwards at the assembled components of a preferred embodiment of a suspension system constructed according to the principles of this invention. FIG. 4 is a perspective inboard view from the back of a vehicle of the disassembled components of a suspension system embodying the principles of this invention. FIG. 5 is a perspective inboard view from the front of a vehicle of the assembled components of a suspension system embodying the principles of this invention. Brake caliper 105 is added to the view of FIG. 5. FIG. 6 is a perspective outboard view from the rear of a vehicle of the disassembled components of a suspension system embodying the principles of this invention. FIG. 7 is a perspective outboard view from the front of a vehicle of the disassembled components of a suspension system embodying the principles of this invention. FIG. 8 is a perspective outboard view of the assembled components of a suspension system embodying the principles of this invention with the road wheel omitted for clarity. FIG. 9 is an overhead view of the assembled components of a suspension system embodying the principles of this invention. FIG. 10 is a perspective inboard view from the rear of a vehicle of the assembled components of a suspension system embodying the principles of this invention as it would appear when installed within the wheel rim of a wheel structure.

Figure 11:
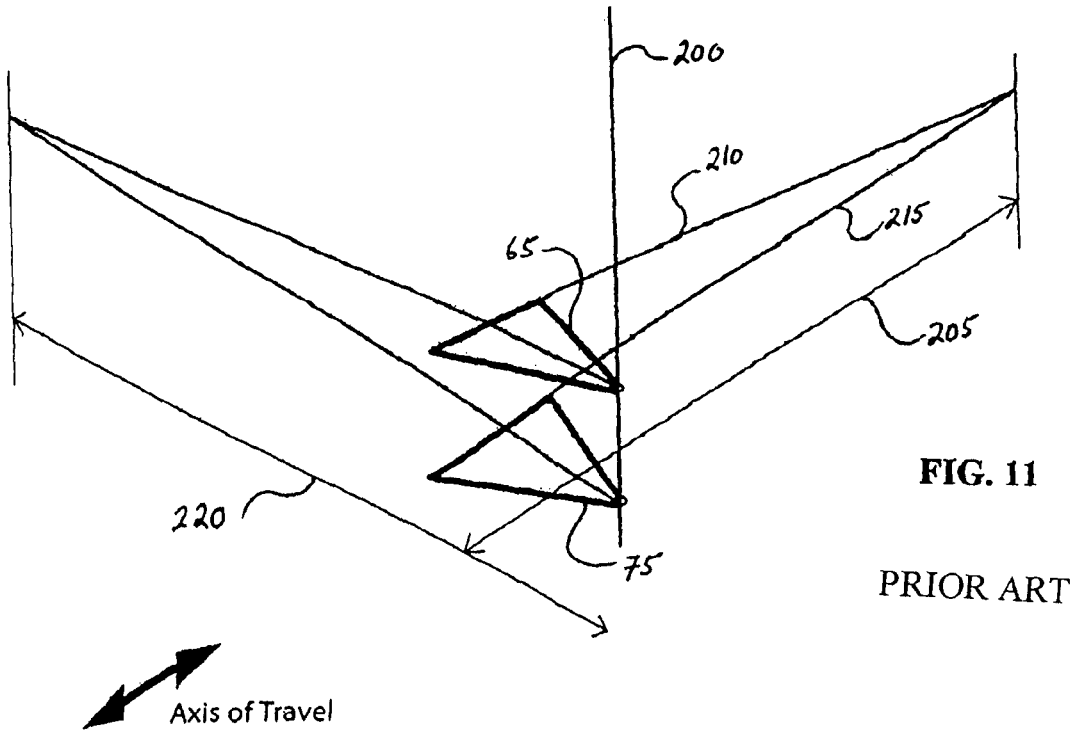
FIG. 11 illustrates the relative axes and pivot links of a conventionally known wishbone suspension.
Figure 12:
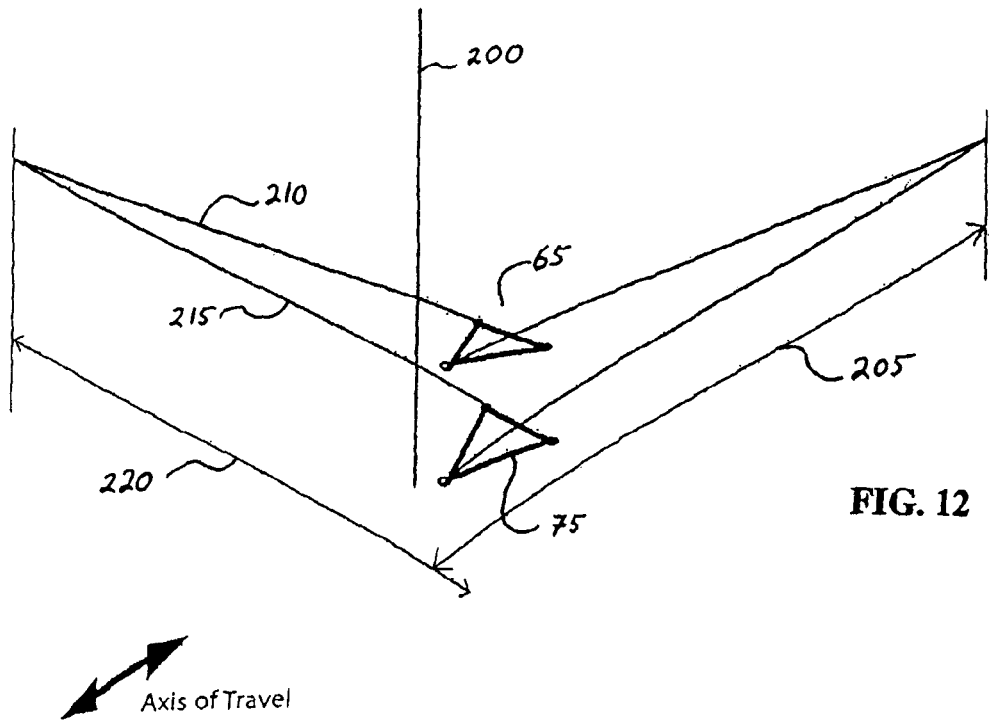
FIG. 12 illustrates the relative axes and pivot links of a suspension configuration embodying the principles of this invention in which steering is accomplished at the inboard end of the steering links.
Figure 13:
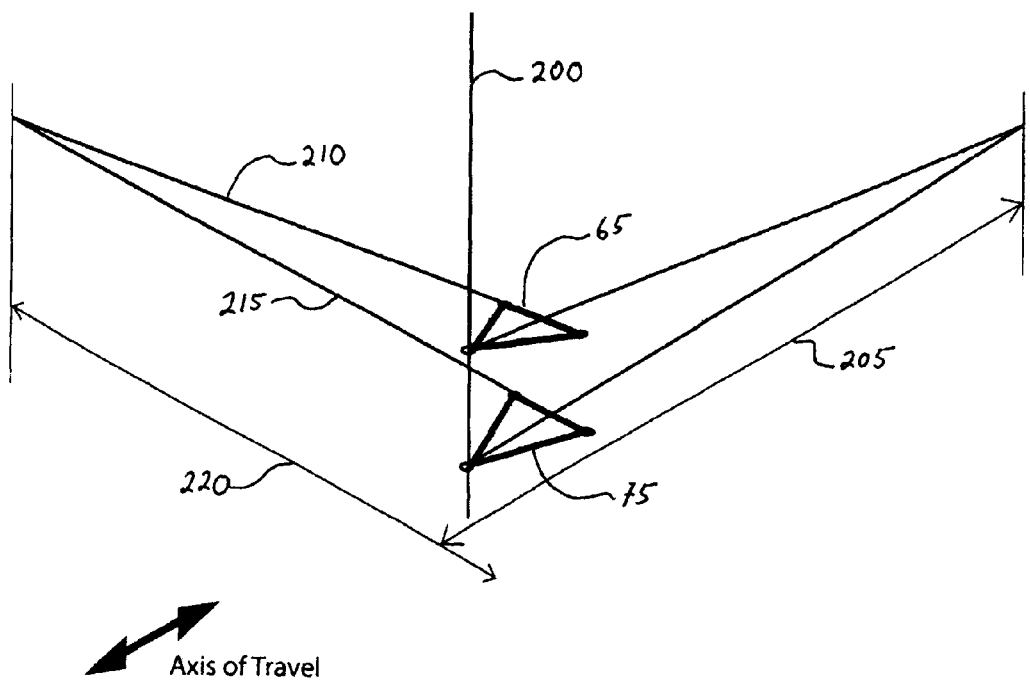
FIG. 13 illustrates the relative axes and pivot links of a suspension configuration embodying the principles of this invention in which steering is accomplished at the outboard end of the steering links.

By implementing the suspension system disclosed herein, the functional location of the vehicle's suspension link pivot axes are rotated approximately 90 degrees when compared with conventionally known wishbone suspensions. This is best demonstrated by initial reference to FIG. 11 in which the relative axes and pivot links of a conventionally known wishbone suspension are shown. Steering axis 200 is perpendicular to one end of upper link 65 and lower link 75. The virtual longitudinal link length 205 runs parallel with the axis of travel of the vehicle indicated by the arrow. Notwithstanding the effects of camber or toe, the arrow. The axis of travel for each wheel is an axis parallel to the plane formed by a longitudinal center cross-section of that wheel across the diameter of that wheel. Thus, since the front wheels steer in the typical vehicle having front and rear wheels, the front and rear wheels may be pointing in different directions at certain points in time such as, for example, when the vehicle is turning and may therefore have different respective axes of travel. For purposes of this disclosure, the virtual longitudinal link length is a longitudinal distance set by the suspension's layout and geometry that most greatly controls the longitudinal radius of the wheel's path as it moves in reaction to a bump or in rebound. Upper link pivot axis 210 and lower link pivot axis 215 run parallel to longitudinal link length 205 and may be slightly inclined towards each other at their outer ends during the travels of the wheel at an angle corresponding to first bearing assembly 95 and second bearing assembly 100 so that their respective longitudinal axes would converge at a distant point termed the instant center. The angle of inclination is between 0 and 45 degrees with a preferable maximum of 30 degrees. Virtual swing axle length 220 runs perpendicularly to virtual longitudinal link length 205. For purposes of this disclosure, the virtual swing axle length is a transverse distance set by the suspension's layout and geometry that most greatly controls the transverse radius of the wheel's path as it moves in reaction to a bump or in rebound. When wheel 20 encounters a bump or moves in rebound after a bump, the distance from the instant center, which is where the axes of upper link 65 and lower link 75 would meet in space were they to be extended, is the radius described by the wheel as it moves up and down. That distance/radius is, depending on whether it is transverse or longitudinal, the virtual swing axle length or the virtual longitudinal link length. The effect of adopting the suspension principles of this invention are displayed in FIGS. 12 and 13 which correspond to the two suspension configurations discussed above. FIG. 12 presents the relative axes and pivot links of a suspension configuration embodying the principles of this invention in which steering is accomplished at the inboard end of the steering links. Steering axis 200 is again substantially vertical but typically somewhat inclined to provide castor and king pin inclination, while virtual longitudinal link length 205 runs parallel with the axis of travel of the vehicle indicated by the arrow and virtual swing axle length 220 runs perpendicularly to virtual longitudinal link length 205. However, upper link pivot axis 210 and lower link pivot axis 215 now run parallel to virtual swing axle 220 and their convergence point defines its length. A similar outcome is demonstrated in FIG. 13 which presents the relative axes and pivot links of a suspension configuration embodying the principles of this invention in which steering is accomplished at the outboard end of the steering links as in the second embodiment. In this latter embodiment, first bearing assembly 95 and second bearing assembly 100 would be a multiple axis bearing such as a spherical bearing so as to permit wheel carrier assembly 90 to both travel up and down and turn to steer as the wheel is in motion. Furthermore, swivel 55 and track rod 50 would be attached to wheel carrier assembly 90 to control steering angle.

In an alternative arrangement, the front and rear suspension on one side of vehicle 5 could be attached to a longitudinal structure that joins the pivot points together rather than to transverse beam 25.

The suspension system disclosed herein provides new and previously unavailable freedom to the vehicle designer and engineer to electively change vehicle design and tune kinematics without sacrificing the normal wishbone suspension's geometric advantages. The following advantages are provided by the disclosed system and structure:

1. Since wheels 20 are positioned outside and away from the vehicle's main body structure 15, as shown in FIG. 1, the shape of the main body structure 15 can be modified to obtain optimal aerodynamic properties, light weight and crash-worthiness.

2. Wheels 20 are part of a regime of jettisonable components that dissipate collision energy and reduce injury-causing peak accelerations.

3. Since the suspension system may be packaged entirely, or almost entirely, inside each wheel 20, the aerodynamic properties of vehicle 5 are enhanced by the placement of cowling 30 which is designed to have a minimized drag over each wheel 20.

4. Transverse beam 25 that connects each wheel assembly to the vehicle's main structure 15 can be any shape chosen to achieve desired aerodynamic properties, crash-protection properties, ground clearance and interior space.

5. Furthermore, by mounting each transverse beam 25 outside the vehicles' main structure 15, each axle's suspension can be assembled on the beam before attachment to the car, providing manufacturing efficiencies and cost reductions. Also, in the event of a crash, beam 25 becomes part of the energy absorption and dissipation sequence of the vehicle.

6. Since the suspension links must be designed primarily for appropriate strength and stiffness, they are necessarily least able to be designed for optimum crush properties. By placing such components outside the vehicle's main structure 15 and a long way from the occupants of the vehicle, as is done in the suspension disclosed herein, the possibility of injuries in the event of a collision are minimized.

7. The suspension disclosed above achieves multiple ends by reorienting a wishbone suspension by approximately 90 degrees so that the longitudinal and transverse functions of the linkage are swapped between the link pivot axis layout and the moving link geometry. This novel arrangement contrasts with current suspensions wherein transverse geometry is defined by the absolute and relative positions of the link pivot axes, and longitudinal geometry is defined by the layout of the links that permit and define wheel vertical travel.

8. Another important difference between ordinary leading/trailing link suspensions and the advance of this new design is the possibility of utilizing unequal length, non-parallel links along the car and non-parallel operating axes across the car. This is analogous to the acknowledged advantages of unequal length non-parallel wishbone (sometimes called "Short-Long Arm") suspension arrangements over equal length parallel links.

9. Additionally, this new arrangement offers the possibility of mounting the operating links outboard of the steering so that steering and suspension geometry are mutually substantially independent. Separating the steering and suspension actions removes bump steer as a design issue and greatly simplifies the steering action if the axle beam, for whatever reason, is something other than a straight member.

The foregoing invention has been described in terms of a preferred embodiment. However, it will be apparent to those skilled in the art that various modifications and variations can be made to the disclosed apparatus and method without departing from the scope or spirit of the invention and that legal equivalents may be substituted for the specifically disclosed elements of the invention. The specification and examples are exemplary only, while the true scope of the invention is defined by the following claims.

What is claimed is:

1. A suspension assembly for a vehicle wheel having a known axis of travel comprising:
    a substantially rigid mounting structure attached to a vehicle;
    a king pin axis to which said mounting structure is attached;
    a steering carrier assembly pivotally attached to said king pin axis wherein vertical movement of the wheel occurs outboard of said steering carrier assembly;
    a steering link track rod movably attached to said steering carrier assembly;
    at least one upper suspension link with at least two ends oriented along its length generally parallel to the axis of travel of the vehicle having a pivot axis generally perpendicular to the axis of travel of the vehicle and pivotally attached on a first sprung end to said steering carrier assembly, said at least one upper suspension link being required to enable vertical movement of the wheel;
    at least one lower suspension link with at least two ends oriented along its length generally parallel to the axis of travel of the vehicle, said at least one lower suspension link spaced below and away from said at least one upper suspension link having a pivot axis generally perpendicular to the axis of travel of the vehicle pivotally attached on a first sprung end to said steering carrier assembly, said at least one lower suspension link being required to enable vertical movement of the suspension; and
    a wheel carrier attached by a first bearing assembly to a second unsprung end of each said at least one upper suspension link and by a second bearing assembly to a second unsprung end of each said at least one lower suspension link; and
    a spring/damper unit having a sprung end and an unsprung end, attached on its sprung end to said king pin axis and on its unsprung end to said wheel carrier; wherein the suspension and steering geometry are substantially independent of each other.

2. The suspension assembly of claim 1 wherein said steering link track rod is attached by a swivel to said steering carrier assembly.

3. The suspension assembly of claim 1 wherein said steering link track rod is movably attached to said wheel carrier.

4. The suspension assembly of claim 1 wherein said mounting structure is either a longitudinal structure or a transverse beam.

5. The suspension assembly of claim 1 wherein the assembly is non-steering, said steering carrier assembly being attached to said king pin axis and said steering link track rod being attached to either said wheel carrier or said steering carrier.

6. The suspension assembly of claim 1, wherein the pivotal attachments for each said upper suspension link and each said lower suspension link to said steering carrier assembly are a third bearing assembly and a fourth bearing assembly, respectively.

7. The suspension assembly of claim 6, wherein the bearing used in each bearing assembly may be any one selected from the group consisting of multiple axis bearings, unidirectional bushings, spherical bushings, compliance bushings and rubber bushings.

8. The suspension assembly of claim 6, wherein said first bearing assembly and said second bearing assembly are stabilized by a shear plate connected between said first bearing assembly and said second bearing assembly.

9. The suspension assembly of claim 8, wherein the shear plate is attached by a bracket bar to said steering carrier assembly.

10. A method for enabling substantially independent setting, adjustment and tuning of longitudinal, transverse and steering geometry in a suspension system for each wheel of a vehicle, each wheel having a king pin axis, a steering carrier assembly, a steering link track rod, a wheel carrier and a spring/damper unit with one sprung end and one unsprung end and each wheel further having at least one upper suspension link and at least one lower suspension link, each link having further at least one sprung end and at least one unsprung end, where each wheel has a known axis of travel comprising, for each wheel:

locating a king pin axis generally perpendicular to one and the same end of each of the upper suspension links and each of the lower suspension link;

attaching the steering carrier assembly pivotally to the king pin axis;

further attaching the steering link track rod movably to the steering carrier assembly;

connecting the sprung end of the spring/damper unit electively either to the king pin axis or to another sprung structure on the vehicle;

further connecting the sprung end of each upper and each lower suspension link to the steering carrier assembly;

orienting each upper and each lower suspension link so as to be generally parallel along their length with the axis of travel for of the vehicle; and yet further attaching the unsprung ends of each upper suspension link and each lower suspension link to the wheel carrier.

11. A suspension assembly for a vehicle wheel having a known axis of travel comprising:

a substantially rigid mounting structure attached to a vehicle;

a king pin axis to which said mounting structure is attached;

a steering carrier assembly pivotally attached to said king pin axis wherein vertical movement of the wheel occurs outboard of said steering carrier assembly;

a steering link track rod movably attached to said steering carrier assembly;

at least one upper suspension link with at least two ends oriented along its length generally parallel to the axis of travel of the vehicle having a pivot axis generally perpendicular to the axis of travel of the vehicle and pivotally attached on a first sprung end to said steering carrier assembly, said at least one upper suspension link being required to enable vertical movement of the wheel;

at least one lower suspension link with at least two ends oriented along its length generally parallel to the axis of travel of the vehicle, said at least one lower suspension link spaced below and away from said at least one upper suspension link having a pivot axis generally perpendicular to the axis of travel of the vehicle pivotally attached on a first sprung end to said steering carrier assembly, said at least one lower suspension link being required to enable vertical movement of the suspension; and a wheel carrier attached by a first bearing assembly to a second unsprung end of each said at least one upper suspension link and by a second bearing assembly to a second unsprung end of each said at least one lower suspension link; and a spring/damper unit having a sprung end and an unsprung end, attached on its sprung end to said king pin axis and on its unsprung end either to one of said at least one upper suspension link or to one of said at least one lower suspension link;

wherein the suspension and steering geometry are substantially independent of each other.

\* \* \* \* \*